Dec. 29, 1936.  S. DI RENZO  2,066,199
STOP DEVICE FOR AUTOMOBILES
Filed Aug. 30, 1933

Inventor:
Simon Di Renzo,
By Jno T. Goodale
Attorney.

Patented Dec. 29, 1936

2,066,199

UNITED STATES PATENT OFFICE 2,066,199

STOP DEVICE FOR AUTOMOBILES

Simon Di Renzo, Landisville, N. J.

Application August 30, 1933, Serial No. 687,449

10 Claims. (Cl. 192—4)

The invention relates to improved means, preferably incorporated in the gear changing portion of the automobile transmission, to prevent the automobile from rolling or drifting either forward or backward, as the case may be.

It is known to those experienced in driving, that when the car is stopped on an incline, especially an upward incline, it is difficult to release the brake and engage the clutch without permitting backward rolling.

In accordance with the present invention when the gear is in low, means are provided acting automatically to prevent backward rolling and when the gear is in reverse means are provided to prevent forward rolling.

As the latter means are less frequently required, the former means only, if preferred, may be supplied.

Referring to the drawing which illustrates merely by way of example a preferred embodiment of the invention:—

Figs. 2 to 5 inclusive are on an enlarged scale.

Similar numerals refer to similar parts throughout the several views.

Figure 1:
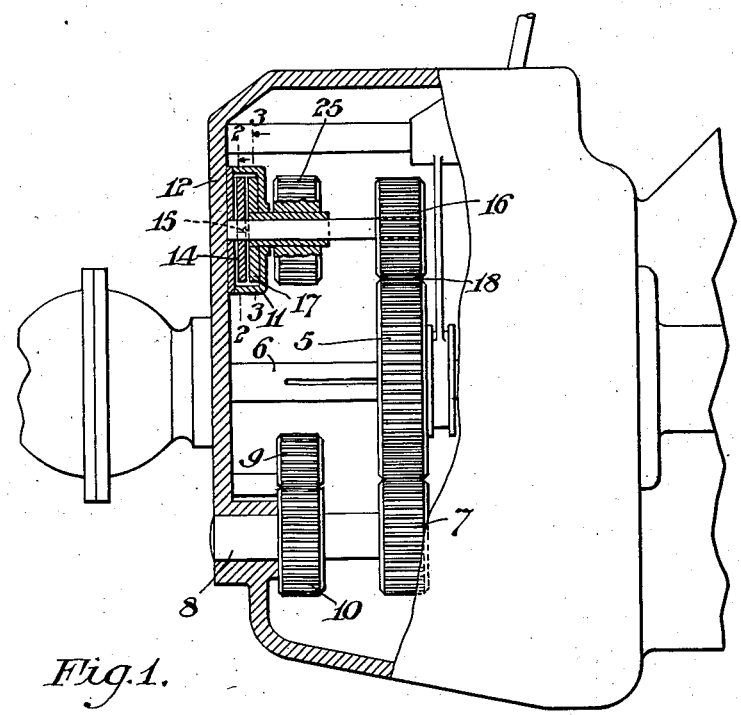
Fig. 1 is a fragmentary view in elevation with parts in section.

In Fig. 1 the gear wheel 5 is the first or low speed gear, splined or feathered upon the propeller shaft 6, and adapted to slide upon said shaft to engage the gear wheel 7 on countershaft 8, to be moved to the left into neutral, and further to the left to engage with the reverse idler 9 driven by gear wheel 10 on countershaft 8 in accordance with the usual arrangement.

To this standard arrangement I provide a self-containing unit including the housing 11, secured in any suitable way to the wall 12 of the transmission housing, as for example by the bolts 13. Within the housing 11 are mounted two discs. Disc 14 is mounted on and fixed to the shaft 15, journalled in the housing 11. Shaft 15 carries the pinion 16 which engages with the gear wheel 5, when in gear with pinion 7. That is, when the transmission is in low gear. Disc 17 is mounted on and fixed to the hollow shaft 18, which is rotatably mounted on shaft 15 and also journalled in the wall of housing 11.

Figure 2:
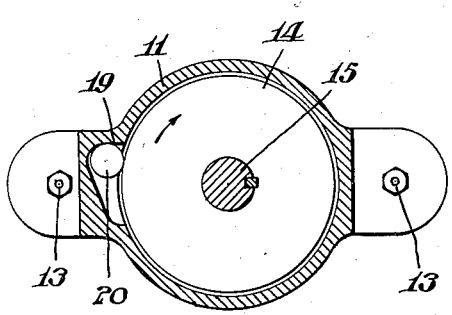
Fig. 2 is a section on the line 2, 2 of Fig. 1.

As shown in Fig. 2, there is provided in the wall of the housing 11 a cam recess 19, opening upon the periphery of disc 14, and in which is seated a roller 20 of diameter less than the depth of the recess at one end and greater than the depth of the recess at the other end. The constructions and proportions being such that the roller 20 tends to seek the smaller end of the recess, due to gravity, and to engage the periphery of the disc 14. The arrow on the disc indicates that the disc rotates freely in clockwise direction.

Figure 3:
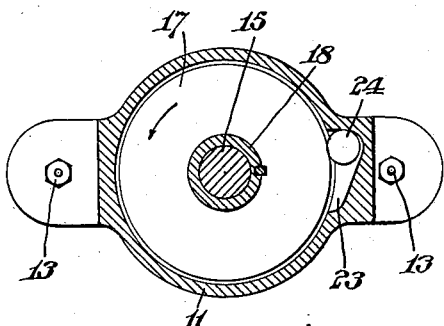
Fig. 3 is a section on the line 3, 3 of Fig. 1

In Fig. 3 is shown the disc 17, with a similar recess 23, in the housing wall, opening upon the periphery of the disc 17 and having roller 24 therein. The arrangement and operation is the same as that shown in Fig. 2 except the recess 23 is oppositely directed as to the large and small end of same, so that disc 17 is adapted to have free rotative movement in counterclockwise direction as indicated by the arrow in disc 17.

Upon the outer end of hollow shaft 18, which carries the disc 17, is mounted the gear wheel or pinion 25 adapted to engage with gear wheel 5 when said gear wheel is shifted to engage with pinion 9 for the reverse.

Figure 4:
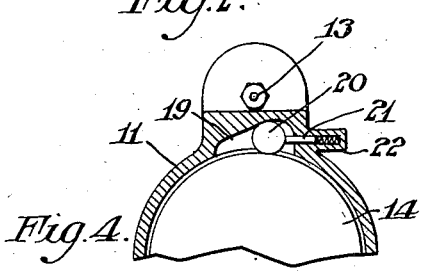
Fig. 4 is a fragmentary detail in section, showing a spring control.

In Fig. 4 is shown a plunger 21 actuated by spring 22 for urging the roller toward the smaller end of recess 19, in lieu of gravity actuation.

Figure 5:
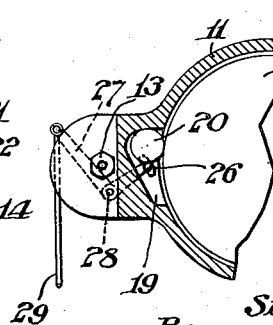
Fig. 5 is a fragmentary detail in section, showing a hand operated control.

In Fig. 5, I show a pin 26 projecting into the recess 19. This pin is carried on an arm 27 of a bell crank lever pivoted at 28 and operated through rod 29 by handle or other means not shown, located convenient to the driver, to push the roller to the larger end of the recess.

In operation it will be seen that when pinion 16 engages gear wheel 5, when the gear is in first or low, the disc 14 will rotate freely when the car travels in forward direction, it being assumed that in said forward travel the disc rotates in clockwise direction, and the roller 20 merely rides toward the larger end of recess 19. In case however the car should start to roll backwards the roller 20 instantly moves toward the smaller end of recess 19 and clamps the disc and consequently gear wheel 16 against rotation and thus prevents the backward movement or rolling of the car.

As the distances or clearance between the roller and adjacent cam wall of recess and the disc are extremely minute, the locking action is practically instantaneous and thus inertia or momentum strains are entirely absent. When the disc rotates normally in the direction of the arrow the roller simply floats out of engaging position so that the contacts with roller and surrounding walls are absolutely silent and practically without friction.

When gear wheel 5 is engaged with gear pinion 9, the gear is said to be in reverse, and the gear wheel is at the same time engaged with pinion 25 of disc 17.

In such case should the car be on a down slope and it is desired to move backward up the hill, the disc and roller arrangement in a similar way will instantly prevent a forward downward drifting when the brake is released. The disc 17 however will instantly release when the car starts to move backward.

As above intimated the situation is usually less difficult when the car is stopped in its forward motion down hill, and it will therefore often be desirable to use only the equipment for preventing the backward drift, in which case disc 17 and pinion 25 may be omitted.

It will be noted that whether one or two discs are used, the entire device for automatically preventing rolling or drifting may be made in a self-containing unit adapted to be installed in any car, without making any changes in the standard equipment, except perhaps, to provide bolt holes in the wall of the transmission housing.

If for any reason it should at any time be desirable to prevent the locking or clamping action of the roller, without shifting the gears, this may be readily accomplished by operating the pin 26 to hold the roller in the larger end of the recess 19.

Or again, when it may be desired to permit the car to purposely roll, it is merely necessary to keep the gear lever in neutral, in which case the gear element 5 is so positioned as to be between the pinions 16 and 25 and out of engagement with both pinions, rendering the locking action of both discs inoperative.

What I claim is:—

1. In combination with the change gear portion of an automobile transmission, a driving shaft and a driven shaft, a gear element feathered on the driven shaft, two pinions, one cooperating with said gear element when in one driving position, the other cooperating with said gear element when in another driving position, two discs, one rotatable with one pinion, the other rotatable with the other pinion, and a fixed body forming with the peripheries of the two discs, oppositely directed tapering recesses, a rolling element in each recess of diameter less than the depth of its recess at one end and greater than said depth at the other end, for permitting the rotation of each disc in one direction only.

2. In combination with the change gear portion of an automobile transmission, having a driven shaft and a driving shaft, a shift-gear feathered on one shaft and a series of cooperating pinions secured upon the other shaft for change speed and reverse, a plurality of controlling pinions, each adapted to cooperate with the shift gear element when in respective predetermined position, and each controlling pinion fixed to automatically operating means for permitting its rotation, in one direction only, said means comprising a series of discs, a fixed body forming, in cooperation with the peripheries of the discs, tapered recesses, rolling elements in said recesses of diameter less than the depth of the recesses at one end and greater than the depth of the recesses at the other end, for permitting rotation of the discs in one direction only.

3. In combination with the change gear portion of an automobile transmission, a driving shaft and a driven shaft, a gear element feathered on the driven shaft, two pinions, one cooperating with said gear element when in one driving position, the other cooperating with said gear element when in another driving position, said pinions provided with automatically operating oppositely acting controls for permitting each pinion to rotate in one direction only which is opposite to the direction of rotation of the other.

4. In combination with the change gear portion of an automobile transmission, having a driven shaft and a driving shaft, a shift gear feathered on one shaft and a series of cooperating pinions secured upon the other shaft for change speed and reverse, a plurality of controlling pinions, each adapted to cooperate with the shift gear element when in respective predetermined position, automatically operating means fixed to each controlling pinion for permitting its rotation in one direction only, said means comprising a series of discs, a fixed body forming, in cooperation with the peripheries of the discs, tapered recesses, spring actuated rolling elements in said recesses of diameter less than the depth of the recesses at one end and greater than the depth of the recesses at the other end, for permitting the rotation of the discs in one direction only.

5. A stop device comprising a plurality of controlling pinions, a plurality of shafts arranged to rotate one within the other, each one of said controlling pinions secured to one of said shafts, each of said pinions and its respective shaft extending to a predetermined position on one end, automatically operating means fixed to the opposite end of each of said shafts for permitting its rotation in one direction only.

6. A stop device comprising a plurality of controlling pinions situated at predetermined positions along alined axes, a plurality of shafts of progressively varying lengths corresponding to the positions of said controlling pinions and adapted to rotate one within the other, each of said controlling pinions secured to the respective shaft extending to its position, automatically operating means fixed to the other end of each of said shafts for permitting its rotation in one direction only.

7. A stop device comprising a plurality of controlling pinions situated at predetermined positions along alined axes, a plurality of shafts of progressively varying lengths corresponding to the positions of said controlling pinions and adapted to rotate one within the other, each of said controlling pinions secured to the respective shaft extending to its position, automatically operating means fixed to the other end of each of said shafts for permitting its rotation in one direction only, said means comprising a series of discs, a fixed body forming in cooperation with the peripheries of the discs, tapered recesses, spring actuated rolling elements in said recesses of diameter less than the depth of the recesses at one end and greater than the depth of the recesses at the other end for permitting rotation of the discs in one direction only.

8. A stop device comprising a plurality of controlling pinions situated at predetermined positions along alined axes, a plurality of shafts of progressively varying lengths corresponding to the positions of said controlling pinions and adapted to rotate one within the other, each of said controlling pinions secured to the respective shaft extending to its position, automatically operating means fixed to the other end of each of said shafts for permitting its rotation in one direction only, said means comprising a series of discs, a fixed body forming in cooperation with the peripheries of the discs, tapered recesses, spring actuated rolling elements in said recesses of diameter less than the depth of the recesses at one end and greater than the depth of the recesses at the other end for permitting rotation of the discs in one direction only, and arbitrarily actuated means for rendering the cooperation between cams and rolling elements ineffective.

9. In combination with the change gear portion of an automobile transmission, having a driven shaft and a driving shaft, a shift gear feathered on one shaft and a series of cooperating pinions secured upon the other shaft for change speed and reverse, a plurality of controlling pinions each adapted to cooperate with the shift gear when in respective predetermined position, a plurality of shafts of progressively varying lengths corresponding to the positions of said controlling pinions and adapted to rotate one within the other, each of said controlling pinions secured to the respective shaft extending to its position, automatically operating means fixed to the other end of each of said shafts for permitting its rotation in one direction only.

10. In combination with the change gear portion of an automobile transmission, having a driven shaft and a driving shaft, a shift gear feathered on one shaft, and a series of cooperating pinions secured upon the other shaft for change speed and reverse, a plurality of controlling pinions each adapted to cooperate with the shift gear when in respective predetermined position, a plurality of shafts of progressively varying lengths corresponding to the positions of said controlling pinions and adapted to rotate one within the other, each of said controlling pinions secured to the respective shaft extending to its position, automatically operating means fixed to the other end of each of said shafts for permitting its rotation in one direction only, said means comprising a series of discs, a fixed body forming in cooperation with the peripheries of the discs, tapered recesses, spring actuated rolling elements in said recesses of diameter less than the depth of the recesses at one end and greater than the depth of the recesses at the other end for permitting rotation of the discs in one direction only.

SIMON DI RENZO.